United States Patent
Miyasato

(10) Patent No.: US 8,485,326 B2
(45) Date of Patent: Jul. 16, 2013

(54) HYDRAULIC SHOCK ABSORBER

(75) Inventor: Eiko Miyasato, Tsukubamirai (JP)

(73) Assignee: SMC Corporation, Tokyo (JP)

( * ) Notice: Subject to any disclaimer, the term of this patent is extended or adjusted under 35 U.S.C. 154(b) by 819 days.

(21) Appl. No.: 12/598,440

(22) PCT Filed: Mar. 18, 2008

(86) PCT No.: PCT/JP2008/055004
§ 371 (c)(1),
(2), (4) Date: Nov. 2, 2009

(87) PCT Pub. No.: WO2008/139780
PCT Pub. Date: Nov. 20, 2008

(65) Prior Publication Data
US 2010/0140031 A1  Jun. 10, 2010

(30) Foreign Application Priority Data
May 14, 2007  (JP) .................................. 2007-128181

(51) Int. Cl.
 *F16F 9/00* (2006.01)
(52) U.S. Cl.
 USPC ...... 188/322.19; 188/288; 188/284; 267/226; 267/221; 267/34
(58) Field of Classification Search
 USPC  188/322.19, 288, 322.22, 287, 284; 267/226, 267/139, 64.11, 221, 34
 See application file for complete search history.

(56) References Cited

U.S. PATENT DOCUMENTS

| | | | | |
|---|---|---|---|---|
| 2,570,362 A | * | 10/1951 | Mercier | 188/282.7 |
| 4,369,864 A | * | 1/1983 | de Carbon | 188/277 |
| 5,074,389 A | * | 12/1991 | Slocum | 188/277 |
| 5,169,131 A | * | 12/1992 | Shimura | 267/221 |
| 5,598,904 A | * | 2/1997 | Spyche, Jr. | 188/287 |
| 6,957,807 B2 | * | 10/2005 | Zimmer et al. | 267/64.11 |
| 2006/0163016 A1 | * | 7/2006 | Ferkany | 188/288 |
| 2009/0001636 A1 | | 1/2009 | Miyasato et al. | |

FOREIGN PATENT DOCUMENTS

| | | |
|---|---|---|
| JP | 59 66044 | 5/1984 |
| JP | 4 54341 | 5/1992 |
| JP | 10 311358 | 11/1998 |
| JP | 11 506529 | 6/1999 |
| JP | 2002 106626 | 4/2002 |
| JP | 2006 220288 | 8/2006 |
| JP | 2006 250309 | 9/2006 |

OTHER PUBLICATIONS

U.S. Appl. No. 13/417,436, filed Mar. 12, 2012, Miyasato, et al.

* cited by examiner

*Primary Examiner* — Melanie Torres Williams
(74) *Attorney, Agent, or Firm* — Oblon, Spivak, McClelland, Maier & Neustadt, L.L.P.

(57) ABSTRACT

In the inside of a cylinder tube, there are provided a piston chamber and an adjusting chamber communicating each other, and these both chambers are filled with oil in a pressurized condition, and further, there are provided a piston moving in an axial direction in the piston chamber and a rod coupled to the piston. An elastic member is located in the inside of the adjusting chamber in a state that a reservoir tank is formed in the adjusting chamber by being compressed by pressurizing force of the oil, and impact is absorbed in such a way that the elastic member is caused to extend and contract by the oil flowing in/flowing out the reservoir tank by movement of the rod.

21 Claims, 1 Drawing Sheet

HYDRAULIC SHOCK ABSORBER

TECHNICAL FIELD

The present invention relates to a hydraulic shock absorber absorbing an impact when a moving object is stopped while utilizing a flow resistance of oil.

BACKGROUND ART

A hydraulic shock absorber, for example, as described in Patent Document, Japanese Patent Application Laid-Open No. 2006-250309, has a configuration in which a piston chamber of a cylinder tube is filled with oil such as mineral oil and a braking piston is accommodated in the piston chamber in a state that a communication gap of the oil is kept at an outer periphery of the piston, and a rod connected to the piston is extended outward from the cylinder tube. Then, kinetic energy of the moving object is absorbed by flow resistance of the oil flowing through the communication gap when the piston shifts by collision of the moving object at the leading end of the rod.

The rod, which is always urged by a restoration spring toward an initial position, repeats an operation of advancing to the initial position by energizing force of the restoration spring after the moving object collides and is retracted to a cushioning position. At this time, since an oil film is formed on the surface of the rod by adhesion of the oil filling the piston chamber, the oil in the piston chamber flows toward outside little by little via the rod caused by repetition of backward and forward movements. As a result, generally, shock-absorbing capacity as the shock absorber lowers while the oil amount in the piston chamber is gradually reduced, and thus the hydraulic shock absorber comes to the end of its life.

In order to prevent lowering of the shock-absorbing capacity caused by such a reduction of the oil amount, the shock absorber may be constituted, for example, as shown in FIG. 3. More specifically, separately from a piston chamber 23 in which the piston 21 and the oil 22 are accommodated, a reservoir tank 24 communicating to the piston chamber 23 is provided in the inside of the cylinder tube 20. The oil 22 in the reservoir tank 24 is always pressurized with a spring 26 via a pressure piston 25. Even though the oil in the piston chamber flows to the outside with the rod 27, the oil amount in the piston chamber 23 is always maintained constant in such a way that the oil corresponding to the reduction amount is replenished from the reservoir tank 24.

However, the shock absorber having such a configuration is designed to pressurize the oil in the reservoir tank 24 with the spring 26 via the pressure piston 25. For this reason, not only the configuration for pressure-application is complicated, but also a wide arrangement space for arranging the pressure piston 25 and the spring 26 becomes necessary, which poses a problem in that an axial length of the shock absorber becomes large.

Patent Document 1: Japanese Unexamined Patent Application Publication No. 2006-250309

DISCLOSURE OF INVENTION

Technical Problem

A technical problem of the present invention is to provide a hydraulic shock absorber with a simple and miniaturized structure, capable of keeping an oil amount in a piston chamber constant without using a spring, a pressure piston or the like.

In order to solve the above problem, a hydraulic shock absorber of the present invention includes: a cylinder tube having a first end wall and a second end wall at both ends thereof in a direction of an axial line, and also having an intermediate wall between these both end walls; a piston chamber and an adjusting chamber, which are formed between the intermediate wall and the first end wall and between the intermediate wall and the second end wall, respectively, so as to mutually communicate through a communicating part formed at the intermediate wall; oil sealed inside the piston chamber and the adjusting chamber in a pressurized state; a pressure control member which pressurizes the oil by operation from outside; a piston which moves in the axial direction in a state that a gap is maintained through which the oil flows between an inner periphery of the piston chamber and an outer periphery of the piston in the inside of the piston chamber; a rod mounted on the piston to extend through the intermediate wall, the adjusting chamber and the second end wall, a leading end of which is introduced to the outside of the cylinder tube; and an elastic member which is disposed in the adjusting chamber, and compressed by pressurizing force of the oil in an initial state where the rod resides at a non-operating position so as to form a reservoir tank in the adjusting chamber due to a space created by compression, the elastic member being extended and contracted elastically based on flowing in/flowing out of the oil into/from the reservoir tank accompanied by the operation of the rod.

In the present invention, it is desirable that the size of the elastic member fills the whole of the adjusting chamber at the time of non-compression.

In addition, in the present invention, at the first end wall of the cylinder tube, there is provided an injection port to allow the oil to be charged into the piston chamber and the adjusting chamber, and the pressure control member serving as a plug blocking the injection port is also provided to be movable forward and backward, so that the oil is pressurized by causing the pressure control member to advance.

In this case, the injection port is formed of a fitting hole part with a small diameter opened to the piston chamber, and a female screw hole part with a large diameter opened to the outside. The pressure control member is formed of a fitting protrusion part with a small diameter fitted airtightly into the fitting hole part via a seal member, and a male screw part with a large diameter threaded in the female screw hole part. With this configuration, the oil is pressurized upon rotating to move ahead the pressure control member.

Also, in the present invention, the second end wall may have a cylindrical-shaped sleeve extending to the position of the intermediate wall along the rod. The adjusting chamber may be formed between an outer periphery of the sleeve and an inner periphery of the cylinder tube, and the elastic member may be arranged between the outer periphery of the sleeve and the inner periphery of the cylinder tube.

In this case, the intermediate wall can be formed at a leading end of the sleeve.

Advantageous Effects

According to the present invention, a hydraulic shock absorber with a simple and miniaturized structure, capable of keeping an oil amount in a piston chamber constant without using a spring, a pressure piston or the like, is provided.

Figure 1:
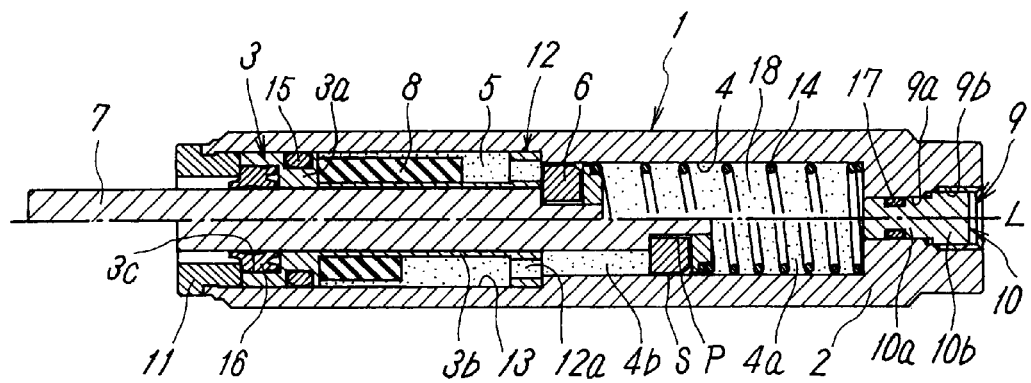
FIG. 1 is a cross sectional view of a hydraulic shock absorber according to the present invention.

EXPLANATION OF REFERENCE 1 cylinder tube
2 first end wall
3 second end wall
3b sleeve
4 piston chamber
5 reservoir tank
6 piston
7 rod
8 elastic member
9 injection port
9a fitting hole part
9b female screw hole part
10 pressure control member
10a fitting protrusion part
10b male screw part
12 intermediate wall
12a communicating part
13 adjusting chamber
17 seal member
18 oil
L axial line
S gap

[Description Of Embodiments]

Figure 2:
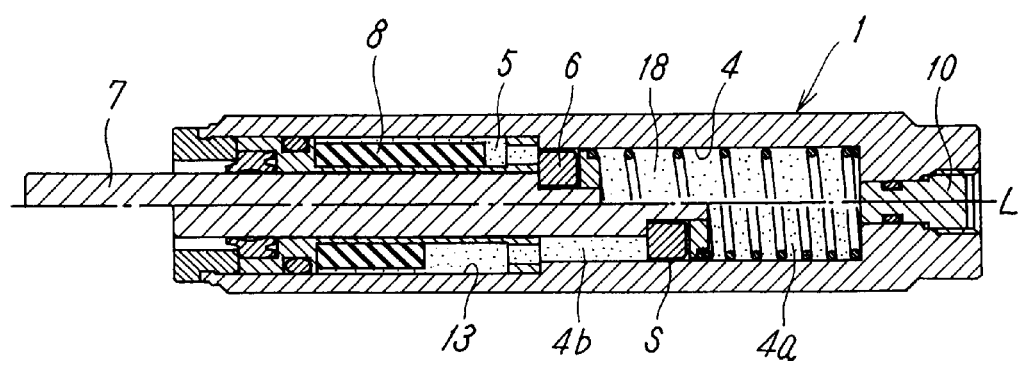
FIG. 2 is a cross sectional view showing a state where oil becomes short in a reservoir tank of the hydraulic shock absorber of the present invention.
Figure 3:
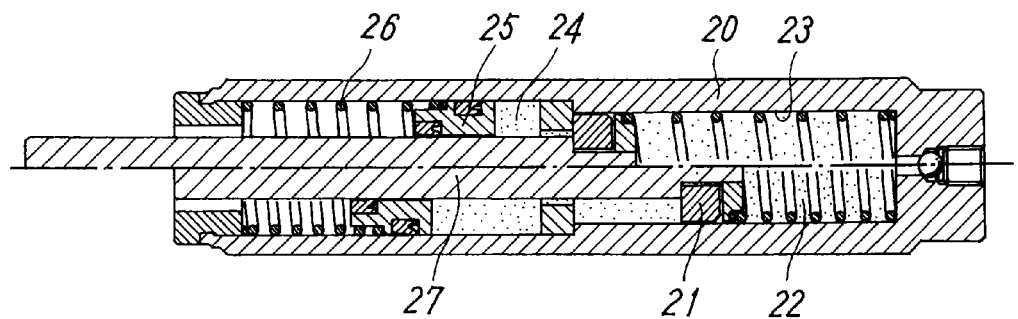
FIG. 3 is a cross sectional view of the hydraulic shock absorber which necessitates improvement.

FIGS. 1 and 2 show one embodiment of a hydraulic shock absorber according to the present invention. The shock absorber has a cylindrical-shaped cylinder tube 1. The cylinder tube 1 has a first end wall 2 located at a proximal end side in a direction of an axial line L, a second end wall 3 located at a leading end side, and an intermediate wall 12 located in its mid-position. In addition, the cylinder tube 1 includes, in its inside, a piston chamber 4 and an adjustment chamber 13 which are formed between the intermediate wall 12 and the first end wall 2 and between the intermediate wall 12 and the second end wall 3, respectively, so as to mutually communicate through a communicating part 12a of the intermediate wall 12; oil 18 filling the piston chamber 4 and the adjustment chamber 13 in the pressurized state; a shock-absorbing piston 6 which moves in the direction of the axial line L in the inside of the piston chamber 4; a rod 7 mounted on the piston 6, a leading end of which is introduced to the outside of the cylinder tube 1; and an extendable elastic member 8 which always makes the oil 18 pressurized.

The cylinder tube 1 and the first end wall 2 are formed integrally. An injection port 9 to allow the oil 18 to be charged into the cylinder tube 1 is formed at a mid section of the first end wall 2. The injection port 9 is blocked with a plug serving as a pressure control member 10 for applying pressurization to the charged oil 18.

The injection port 9 has a fitting hole part 9a with a small diameter opened to the piston chamber 4, and a female screw hole part 9b with a large diameter opened to the external part while connecting to its outside. On the other hand, the pressure control member 10 has a fitting protrusion part 10a with a small diameter at the leading end side which is fitted airtightly into the fitting hole part 9a via a seal member 17, and a male screw part 10b with a large diameter which is threaded in the female screw hole part 9b. The oil 18 in the cylinder tube 1 is pressurized by the pressure control member 10 rotating to move ahead.

The second end wall 3, which is formed separately from the cylinder tube 1, is fitted into the cylinder tube 1 via an O-ring 15. The second end wall 3 has integrally a blocking part 3a which blocks the leading end part of the cylinder tube 1, and a cylindrical-shaped sleeve 3b which extends toward the internal side of the cylinder tube 1 along an outer periphery of the rod 7 from the blocking part 3a. A seal member 16 which seals between the blocking part 3a and the outer periphery of the rod 7 is attached to a recessed groove 3c formed on an outer end inner peripheral part of the blocking part 3a. The second end wall 3 and the seal member 16 are fixed at the mounting position with an annular fixing member 11 attached on the end part of the cylinder tube 1.

Meanwhile, the sleeve 3b, as shown in FIGS. 1 and 2, is formed to be long in the axial direction of the cylinder tube 1, and configured so as to function also as a bearing and a guide for the rod 7. Herewith, even if an offset load acts to the rod 7, the rod 7 can be moved forward and backward in an appropriate direction. Accordingly, it is possible to prevent movement of the piston 6 from being disturbed when the piston 6 comes into contact with a wall surface of the piston chamber 4. This enables to cushion the impact stably.

The intermediate wall 12 is integrally provided on the leading end of the sleeve 3b. The piston chamber 4 is formed between the intermediate wall 12 and the first end wall 2, and an adjusting chamber 13 is formed between the intermediate wall 12 and the blocking part 3a of the second end wall 3. Accordingly, the piston chamber 4 is located at the proximal end side of the cylinder tube 1, and the adjusting chamber 13 is located at the leading end side of the cylinder tube 1.

However, the intermediate wall 12 may be formed separately from the sleeve 3b and joined to the sleeve 3b. Alternatively, the intermediate wall 12 can be formed integrally with the cylinder tube 1. Further, the intermediate wall 12 may be formed as an independent member, and fitted into the cylinder tube 1 in a state that the intermediate wall 12 is brought into contact with the leading end of the sleeve 3b.

The piton 6 having a smaller external diameter than the internal diameter of the piston chamber 4 is accommodated in the piton chamber 4 so as to be movable in the direction of the axial line L of the cylinder tube 1, with a gap S kept where the oil 18 flows between the outer periphery of the piston 6 and the inner periphery of the cylinder tube 1. In addition, between the piston 6 and the first end wall 2, arranged is a restoration spring 14 which always energizes the piston 6 toward an initial position (position of upper half part of FIG. 1) where the piston 6 is brought into contact with the intermediate wall 12. Then, the constitution is such that when the piston 6 moves toward a cushioning position shown in a lower half part of FIG. 1 from the initial position, the oil 18 in a head side chamber part 4a between the piston 6 and the first end wall 2 moves to a rod side chamber part 4b between the piston 6 and the intermediate wall 12 through the gap S, while when the piston 6 returns to the initial position from the cushioning position, the oil 18 in the rod side chamber part 4b moves to the head side chamber part 4a through the gap S. In this case, simultaneously, the oil 18 in the rod side chamber part 4b may move to the head side chamber part 4a through a gap P formed between the rod 7 and the piston 6.

In addition, the proximal end part of the rod 7 is joined to the piston 6, and the piston 6 and the rod 7 integrally move forward and backward in the direction of the axial line L of the cylinder tube 1.

The rod 7 extends through the intermediate wall 12 and the second end wall 3. The leading end part of the rod 7 is introduced to the outside of the cylinder tube 1, and a moving object to be a braking object collides to the leading end part.

When an impact caused by the moving object is applied to the rod 7, the piston 6 is pushed by the rod 7 and backs toward the first end wall 2 side in the piston chamber 4, while when operation force by the moving object is removed, the piston 6 and the rod 7 are advanced by energizing force of the restoration spring 14 to return to the initial position.

The adjusting chamber 13 is a cylindrical-shaped chamber surrounding the circumference of the rod 7. The adjusting chamber 13 is formed between an outer periphery of the cylindrical-shape sleeve 3b formed on the second end wall 3 and an inner periphery of the cylinder tube 1. The external diameter of the adjusting chamber 13 is formed larger than the internal diameter of the piston chamber 4.

The elastic member 8 with a cylindrical shape is accommodated in the adjusting chamber 13 so as to be extendable in the direction of the axial line L and in the diameter direction of the cylinder tube 1. The elastic member 8 can be formed with a foam rubber made of an extendable foam (for example, a foam rubber made of nitrile rubber (NBR) or a synthetic resin foam) having closed cells. The elastic member 8 is arranged in the adjusting chamber 13 so as to surround the sleeve 3b. In the initial state where the rod 7 occupies a position of an advance end, the elastic member 8 is in the state being elastically compressed by pressure of the oil 18 pressurized. The reservoir tank 5 is formed in the adjusting chamber 13 by a space created due to its shrinkage.

It is desirable that the length in the direction of the axial line L, and the internal diameter and external diameter of the elastic member 8 at the time of non-compression are approximately equal to those of the adjusting chamber 13, or slightly smaller or slightly larger than those of the adjusting chamber 13. In other words, a preferable size of the elastic member 8 is the size approximately filling the whole of the adjusting chamber 13. In this case, the reservoir tank 5 is not formed in the adjusting chamber 13.

Meanwhile, the state where the elastic member 8 moves to the second end wall 3 side is shown in the example illustrated. However, the elastic member 8 does not necessarily occupy such a position invariably, and in some cases, the elastic member 8 occupies a center part or the other position of the adjusting chamber 13.

The reservoir tank 5 communicates with the piston chamber 4 each other through the communicating part 12a formed on the intermediate wall 12. Accordingly, the oil 18 charged in the inside of the piston chamber 4 and the reservoir tank 5 is in the state being pressurized by the elastic restoring force of the compressed elastic member 8.

The reservoir tank 5 absorbs a volume difference between the both chamber parts 4a, 4b, upon receiving part of the oil 18 flowing to the rod side chamber part 4b from the head side chamber part 4a, that is, the oil corresponding to a volume of the rod 7 entering the rod side chamber part 4b, when the piston 6 and the rod 7 start retreat from the initial position that is the position of the advance end to move to the cushioning position. Since the amount of the flowing oil 18 differs depending on the position of the piston 6, the volume of the reservoir tank 5 changes in accordance with the amount of the oil 18. Specifically, when the piston 6 is pushed in to move to the cushioning position, the amount of the oil flowing in the reservoir tank 5 becomes large gradually, so that the volume of the reservoir tank 5 is enlarged as the compression amount of the elastic member 8 becomes large gradually. On the contrary, when the piston 6 returns to the initial position from the cushioning position, the oil in the reservoir tank 5 flows out, so that the elastic member 8 is elongated and the volume in the reservoir tank 5 is reduced.

There will be described operation of the hydraulic shock absorber having the above configuration. When the shock absorber is not operated, the piston 6 is pushed by the restoration spring 14, and occupies the initial position where the piston 6 comes into contact with the intermediate wall 12, as shown in the upper half part of FIG. 1. At this time, the reservoir tank 5 is formed in the adjusting chamber 13 by the compressed elastic member 8, and the oil 18 in the cylinder tube 1 is in the state being pressurized by the restoring force of the elastic member 8.

When the moving object collides with the rod 7 in this state, the piston 6 is pushed by the rod 7 and moves to the cushioning position, as shown in the lower half part of FIG. 1. Then, the oil 18 in the head side chamber part 4a flows to the rod side chamber part 4b through the gap S of the outer periphery of the piston 6 accompanied by movement of the piston 6 and the rod 7, so that the kinetic energy of the moving object is absorbed by flow resistance at that time. The oil corresponding to the volume of the rod 7 entering the rod side chamber part 4b among the oil 18 flowing into the rod side chamber part 4b flows into the reservoir tank 5, and further compresses the elastic member 8 to enlarge the volume of the reservoir tank 5.

When the operation force by the moving object is not applied to the rod 7, the piston 6 and the rod 7 return to the initial position that is the advance end by the energizing force of the restoration spring 14. At this time, the oil in the reservoir tank 5 is ejected from the reservoir tank 5 by the elastic restoring force of the elastic member 8, and the oil flows in the head side chamber part 4a through the rod side chamber part 4b, which permits restoration of the piston 6. In addition, the shrunk elastic member 8 restores together with effusion of the oil from the reservoir tank 5, resulting in the initial state shown in the upper half part of FIG. 1.

When repeating operation of the shock absorber causes the rod 7 to repeat advance and retreat, the oil 18 flows to the outside little by little while adhering on the surface of the rod 7, and the oil amount in the piston chamber 4 decreases gradually. In this event, as shown in FIG. 2, the oil 18 in the reservoir tank 5 is ejected by the elastic restoration force of the elastic member 8 by only an amount corresponding to reduction, which is replenished into the piston chamber 4. As a result, the oil amount in the piston chamber 4 is always maintained constant.

When the volume of the reservoir tank 5 decreases as the oil amount in the piston chamber 4 decreases, the degree of shrinkage of the elastic member 8 also decreases, so that the pressurizing force of the oil decreases. When desiring to increase the pressurizing force by the elastic member 8 while enlarging the volume of the reservoir tank 5 from that state, the oil may be pressurized by tightening the pressure control member 10.

In this way, the reservoir tank 5 is formed by compressing the elastic member 8 with the pressurizing force of the oil, and the oil in the reservoir tank 5 is ejected in accordance with the amount corresponding to reduction of the oil in the piston chamber 4 based on the elastic restoration force of the elastic member 8. Therefore, for example, as compared with the case where a pressurizing piston and a spring are used, the configuration becomes simple because the number of parts used is small, and it becomes possible to miniaturize the shock absorber by suppressing the length of the shock absorber in the direction of the axial line L.

In the embodiment, the cylindrical-shaped elastic member 8 is formed into a solid body with a foam having closed cells, but any constitution may be used as long as the elastic member 8 can cause volumetric change by hydraulic operation.

For example, the elastic member 8 may be one which is formed in a bladder shape by using a flexible and non-porous material such as rubber. Also, the elastic member 8 may be formed by bending a plate-shaped foam into a cylindrical shape in accordance with the internal shape of the adjusting chamber.

The invention claimed is:

1. A hydraulic shock absorber comprising:
a cylinder tube having a first end wall and a second end wall at respective ends thereof in a direction of an axial line, and also having an intermediate wall between said end walls;
a piston chamber and an adjusting chamber, which are formed in the cylinder tube between the intermediate wall and the first end wall and between the intermediate wall and the second end wall, respectively, so as to mutually communicate through a communicating part formed at the intermediate wall;
oil sealed inside the piston chamber and the adjusting chamber in a pressurized state;
a pressure control member which pressurizes the oil by operation from outside the cylinder tube so as to increase a pressurizing force of the oil, whose pressurized state lowers due to a reduction of an amount of the oil caused by operation of the shock absorber;
a piston which moves in the direction of the axial line with a gap maintained through which the oil flows between an inner periphery of the piston chamber and an outer periphery of the piston in the piston chamber;
a rod mounted on the piston to extend through the intermediate wall, the adjusting chamber and the second end wall, a leading end of which is introduced to the outside of the cylinder tube;
an elastic member arranged in the adjusting chamber and formed of a foam made of synthetic rubber or a synthetic resin, whose volume varies according to a hydraulic pressure in the adjusting chamber, wherein the elastic member is compressed by the pressurizing force of the oil in an initial state where the rod resides at a non-operating position, so as to form a reservoir tank in the adjusting chamber due to a space created by the compression of the elastic member, the elastic member being extended and contracted elastically based on flowing in/flowing out of the oil into/from the reservoir tank during the operation of the rod.

2. The shock absorber according to claim 1, wherein the size of the elastic member is a size filling a whole of the adjusting chamber at the time of non-compression.

3. The shock absorber according to claim 1, further comprising
an injection port at the first end wall of the cylinder tube to allow the oil to be charged into the piston chamber and the adjusting chamber, and
a pressure control member movable forward and backward and serving as a plug blocking the injection port, so that the oil is pressurized by causing the pressure control member to advance.

4. The shock absorber according to claim 2, further comprising
an injection port at the first end wall of the cylinder tube to allow the oil to be charged into the piston chamber and the adjusting chamber, and
a pressure control member movable forward and backward and serving as a plug blocking the injection port, so that the oil is pressurized by causing the pressure control member to advance.

5. The shock absorber according to claim 3, wherein the injection port is formed of a fitting hole part with a small diameter opened to the piston chamber, and a female screw hole part with a large diameter opened to the outside, and the pressure control member is formed of a fitting protrusion part with a small diameter which is fitted airtightly into the fitting hole part via a seal member, and a male screw part with a large diameter which is threaded in the female screw hole part, so that the oil is pressurized upon rotating to move ahead the pressure control member.

6. The shock absorber according to claim 4, wherein the injection port is formed of a fitting hole part with a small diameter opened to the piston chamber, and a female screw hole part with a large diameter opened to the outside, and the pressure control member is formed of a fitting protrusion part with a small diameter which is fitted airtightly into the fitting hole part via a seal member, and a male screw part with a large diameter which is threaded in the female screw hole part, so that the oil is pressurized upon rotating to move ahead the pressure control member.

7. The shock absorber according to claim 1, wherein the second end wall has a cylindrical-shaped sleeve extending to a position of the intermediate wall along the rod, the adjusting chamber is formed between an outer periphery of the sleeve and an inner periphery of the cylinder tube, and the elastic member is arranged between the outer periphery of the sleeve and the inner periphery of the cylinder tube.

8. The shock absorber according to claim 2, wherein the second end wall has a cylindrical-shaped sleeve extending to a position of the intermediate wall along the rod, the adjusting chamber is formed between an outer periphery of the sleeve and an inner periphery of the cylinder tube, and the elastic member is arranged between the outer periphery of the sleeve and the inner periphery of the cylinder tube.

9. The shock absorber according to claim 3, wherein the second end wall has a cylindrical-shaped sleeve extending to a position of the intermediate wall along the rod, the adjusting chamber is formed between an outer periphery of the sleeve and an inner periphery of the cylinder tube, and the elastic member is arranged between the outer periphery of the sleeve and the inner periphery of the cylinder tube.

10. The shock absorber according to claim 4, wherein the second end wall has a cylindrical-shaped sleeve extending to a position of the intermediate wall along the rod, the adjusting chamber is formed between an outer periphery of the sleeve and an inner periphery of the cylinder tube, and the elastic member is arranged between the outer periphery of the sleeve and the inner periphery of the cylinder tube.

11. The shock absorber according to claim 5, wherein the second end wall has a cylindrical-shaped sleeve extending to a position of the intermediate wall along the rod, the adjusting chamber is formed between an outer periphery of the sleeve and an inner periphery of the cylinder tube, and the elastic member is arranged between the outer periphery of the sleeve and the inner periphery of the cylinder tube.

12. The shock absorber according to claim 6, wherein the second end wall has a cylindrical-shaped sleeve extending to a position of the intermediate wall along the rod, the adjusting chamber is formed between an outer periphery of the sleeve and an inner periphery of the cylinder tube, and the elastic member is arranged between the outer periphery of the sleeve and the inner periphery of the cylinder tube.

13. The shock absorber according to claim 7, wherein the intermediate wall is formed at a leading end of the sleeve in the second end wall.

14. The shock absorber according to claim 8, wherein the intermediate wall is formed at a leading end of the sleeve in the second end wall.

15. The shock absorber according to claim 9, wherein the intermediate wall is formed at a leading end of the sleeve in the second end wall.

16. The shock absorber according to claim 10, wherein the intermediate wall is formed at a leading end of the sleeve in the second end wall.

17. The shock absorber according to claim 11, wherein the intermediate wall is formed at a leading end of the sleeve in the second end wall.

18. The shock absorber according to claim 12, wherein the intermediate wall is formed at a leading end of the sleeve in the second end wall.

19. The shock absorber according to claim 1, further comprising an injection port in the first end wall, wherein the pressure control member is screwed into the injection port and includes a seal member positioned between an outer periphery thereof and an inner periphery of the injection port when the pressure control member is screwed into the injection port.

20. A hydraulic shock absorber comprising:
a cylinder tube having a first end wall and a second end wall at respective ends thereof in a direction of an axial line, and also having an intermediate wall between said end walls;
a piston chamber and an adjusting chamber, which are formed in the cylinder tube between the intermediate wall and the first end wall and between the intermediate wall and the second end wall, respectively, so as to mutually communicate through a communicating part formed at the intermediate wall;
oil sealed inside the piston chamber and the adjusting chamber in a pressurized state;
an injection port including a screw hole formed in the first end wall of the cylinder tube in the direction of the axial line thereof to allow the oil to be charged into the piston chamber and the adjusting chamber;
a pressure control member serving as a plug, which has a leading end surface screwed in the injection port so as to directly face the piston chamber, and makes the oil pressurized by operation from outside the cylinder tube;
a piston which moves in the direction of the axial line with a gap maintained through which the oil flows between an inner periphery of the piston chamber and an outer periphery of the piston in the piston chamber;
a rod mounted on the piston to extend though the intermediate wall, the adjusting chamber and the second end wall, a leading end of which is introduced to the outside of the cylinder tube;
an elastic member which is arranged in the adjusting chamber and formed of a foam made of synthetic rubber or a synthetic resin, and whose volume varies by being extended and contracted elastically based on flowing in/flowing out of the oil into/from the adjusting tank by the operation of the rod; and
a reservoir tank formed in the adjusting chamber due to a space created by compression of the elastic member caused by the pressurized oil in an initial state where the rod resides at a non-operating position, the reservoir tank having a function of causing the oil from the piston chamber to flow thereinto/out to the piston chamber due to a change in volume thereof in accordance with extension and contraction of the elastic member by the operation of the rod, and a function of replenishing, when an amount of the oil decreases by the operation of the rod, the amount of the oil corresponding to reduction due to a decrease in volume thereof in accordance with extension of the elastic member.

21. The shock absorber according to claim 20, wherein the pressure control member includes a seal member positioned between an outer periphery thereof and an inner periphery of the injection port when the pressure control member is screwed into the injection port.

* * * * *